June 10, 1958     J. B. CLARK, JR., ET AL     2,838,117
FRACTURING FORMATIONS AT SELECTED ELEVATIONS
Filed May 22, 1953
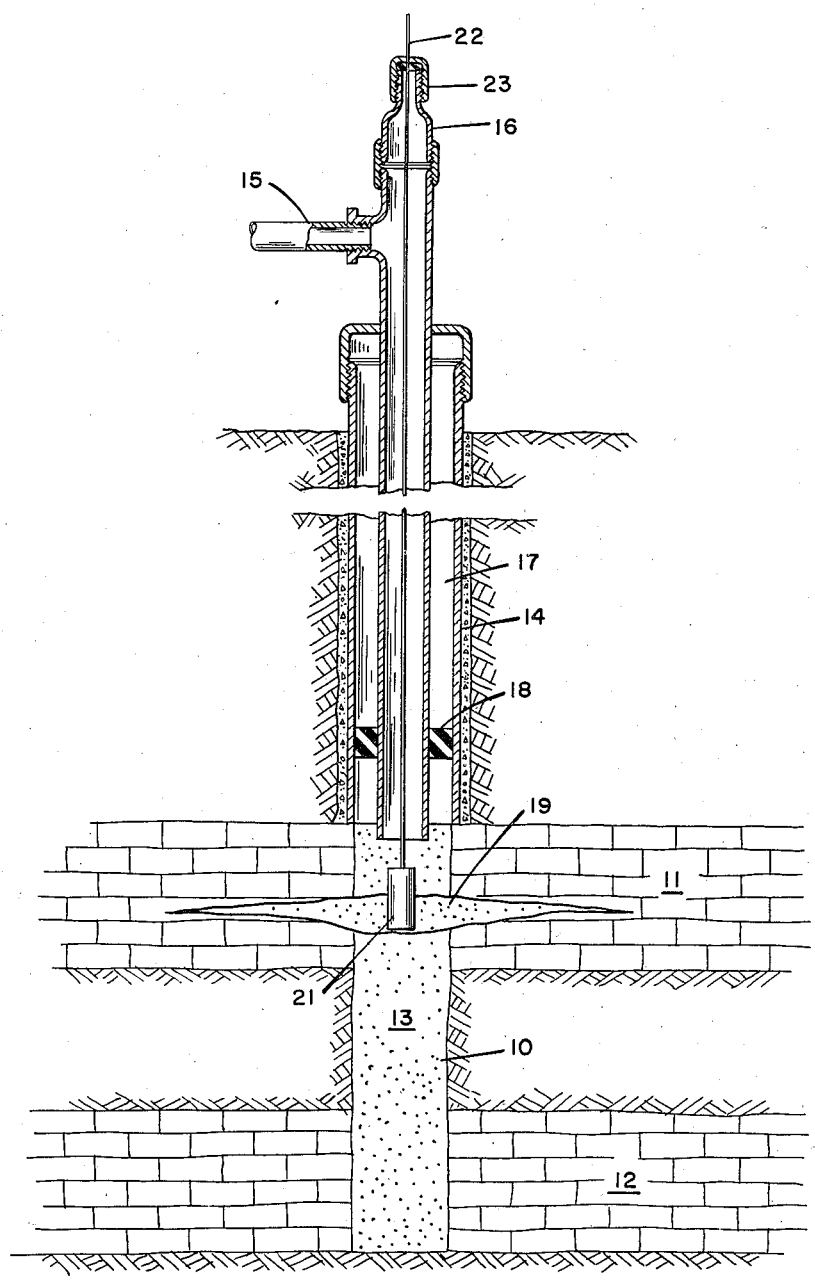
INVENTORS
JOSEPH B. CLARK, JR.
KARL DYK
BY 
ATTORNEY

2,838,117

FRACTURING FORMATIONS AT SELECTED ELEVATIONS

Joseph B. Clark, Jr., and Karl Dyk, Tulsa, Okla., assignors to Pan American Petroleum Corporation, a corporation of Delaware Application May 22, 1953, Serial No. 356,881

8 Claims. (Cl. 166—42)

This invention pertains to an improved process for increasing the fluid productivity of subterranean formations. More particularly, this invention pertains to an improvement in hydraulic fracturing processes wherein the fractures may be produced at selected elevations.

In the art of hydraulically fracturing fluid producing formations penetrated by a well, a low-penetrating liquid is injected into the well and a fracture is produced indiscriminately at the formation, or at the elevation within a substantially homogeneous formation, which is most easily fractured. While methods have been developed by which fractures can be produced in a well at more than one elevation, these methods generally produce a fracture at the weakest and most permeable formation first. Other formations can then be fractured by plugging previous fractures so that the formations can only be fractured after the weaker and generally more permeable formations have been fractured.

It is, therefore, an object of this invention to provide an improved process for selectively fracturing subterranean formations penetrated by a well. It is a more specific object of this invention to provide an improved process wherein the less permeable formations can be fractured without first fracturing the more permeable formations. It is a still more specific object of this invention to provide a process for hydraulically fracturing formations by causing the fracturing liquid which is pumped into a well and which tends to fracture the most permeable of many formations penerated by the well to penetrate and fracture a selected formation. These and other objects of this invention will become apparent from the following description of the invention. In this description reference will be made to the accompanying drawing showing a schematic view of a well with means for fracturing a formation exposed to the well at a selected elevation.

In brief, this invention comprises a process for hydraulically fracturing selected subterranean formations wherein a part of the fracturing liquid is caused to penetrate a selected formation and then a hydraulic pressure is applied to the fracturing liquid to produce the fracture at the selected elevation where penetration was initiated. Penetration of a part of the fracturing liquid into a certain formation at a selected elevation may be initiated by any of a number of means.

It can be shown mathematically and it has been proved in practice that the equations for rupture of thick-walled cylinders do not apply where there is some penetration of the fluid into the walls of the cylinder. The following will illustrate this phenomenon. A ⅜ inch diameter hole was drilled axially in each of two identical 3½ inch by 6 inch apparently homogeneous sandstone cores showing no bedding planes or fissures. The cores had a permeability to water of 200 millidarcies when water was injected into the ⅜ inch diameter axial bore. A low-penetrating liquid comprising an oil-water emulsion having a viscosity of about 3,000 centipoises on the Halliburton Thickening Time Tester as described in A. P. I. RP 10 B, Recommended practice for testing oil well cements, third edition, February 1953, and a filtrate rate of about 3 cubic centimeters in 30 minutes in the A. P. I. filter press described in A. P. I. RP 29, third edition, May 1950, was injected into the ⅜ inch diameter bore in the core. The core was fractured at a pressure of 1,500 p. s. i., and a subsequent examination of the fragments of the core indicated that the low-penetrating liquid had not penetrated the walls of the bore to any noticeable extent. A fracturing fluid having a higher filtrate rate, namely a mineral oil having a viscosity of about 160 centipoises and a filtrate rate in the above-described apparatus using No. 52 filter paper of about 1 cubic centimeter per second, was then injected into the bore of the second core. This second core was fractured at a pressure of 300 p. s. i. A subsequent examination of the fragments of the core indicated that the fracturing liquid had penetrated out into the walls of the bore about 1 inch minimum. Thus it can be seen that the pressure required to fracture a formation depends somewhat upon the penetration of the fracturing liquid into the walls of the well. It will also be apparent, however, that the fracturing liquid must have a filtrate rate low enough to prevent it from filtering through the formations adjacent the well so rapidly that a formation-breakdown or fracturing pressure cannot be established. The filtrate rate of the low-penetrating liquid at the elevation of the formation which is to be fractured thus desirably has a filtrate rate low enough to permit the buildup of a fracturing pressure and high enough to permit at least some penetration of the fracturing liquid into the formation which is to be fractured.

A low-penetrating liquid may be prepared as described in Re. 23,733. This liquid is desirably a liquid which, with respect to the natural or connate fluids in the well such as water and crude oil, has a considerably retarded tendency to filter through the formations. These liquids in general either have a greater viscosity than water or the crude oil produced from the well to be treated, they tend to plaster or produce a filter cake on the walls of permeable formations, or they have both a high viscosity and tend to produce a filter cake on permeable formations. A low-penetrating liquid, particularly one without suspended solids, may have a viscosity of from at least about 30 centipoises to about 5,000 centipoises or higher as measured on the above-described viscosimeter. Alternatively, it desirably has a filtrate rate in the above-described apparatus of about 100 cubic centimeters or less in 30 minutes. Inasmuch as the ultimate criterion for a low-penetrating liquid is, as indicated, dependent upon its tendency relative to the formation fluids to have a retarded flow through the formations which are to be fractured, the preferred test of a low-penetrating liquid is a filter test through a sample of the formations which are to be fractured or similar formations. This might comprise, for example, the injection of well fluids such as water or oil through a core sample of the formation penetrated by the well. The flow rate through a standard sample, for example, a ¾ inch by 1 inch core might be determined first by injecting crude oil from the formation to be fractured through it at a standard pressure differential, e. g., 100 pounds across the core, and noting the amount of flow. The low-penetrating liquid then might be pumped through the core with the same pressure differential across the core. A low-penetrating liquid flows through the core at a rate substantially lower than the flow rate for the well fluids, typically at ¼ or less the rate of flow of the crude oil.

This low-penetrating or fracturing liquid may be prepared by any of a number of processes, and in some cases, natural liquid such as asphaltic crudes or highly viscous crudes, those having greater than about 30 centipoise viscosity on the above-described viscosimeter, may be employed. The fracturing liquid in the case of oil-producing formations and particularly oil-producing sandstone formations is desirably an oily or an oil-base liquid. It is typically prepared by adding a bodying agent, e. g., a colloidal material such as a metallic soap, to the oil base to produce a viscous liquid having a relatively low filtrate rate. Viscous oils such as high molecular weight polymers and distillates are also suitable fracturing liquids. The fracturing liquid may also comprise an emulsion of two or more immiscible fluids such as water and oil. These fracturing liquids may thus comprise any of the fracturing liquids now known in the art. One essential characteristic of a low-penetrating or fracturing liquid is that its filtrate rate or tendency to filter through the formation must be increased after the fracturing liquid has been injected into a formation. This reversion of the fracturing liquid to a liquid which flows out of the formation or filters through the formation substantially as readily as the formation fluids may be accomplished by a number of methods. For example, the filtrate rate of the fracturing liquid may be increased by the use of a solvent, by a substantial change in temperature, by destroying the emulsifying agent, or the like. All of these means for reverting the fracturing liquid are referred to generically herein as "breakers." In the case, for example, of a fracturing liquid comprising a hydrocarbon bodied with a metallic soap, the filter rate of the fracturing liquid may be reverted to the filter rate of the base hydrocarbon by contacting the metallic soap-hydrocarbon complex with a strong mineral acid or a strong surface active agent, particularly a cationic surface active agent. The breaker may also comprise, particularly in the case of viscous Newtonian liquids, a miscible diluent. A "breaker" as the term is used herein, therefore, includes any material which may be disposed in a well and which either chemically or physically considerably decreases the viscosity and/or increases the filter rate of the specific low-penetrating liquid after that liquid has been introduced into the well.

In the operation of our process, a well 10, which penetrates a multiplicity of permeable formations 11 and 12 and is exposed to those formations either through the open hole portion 13 of the well below the casing 14, as shown, or through casing perforations where the casing extends through the permeable formations, may be fractured at any selected elevation according to the following procedure. A high pressure pump (not shown) is connected to the flow line 15 to inject fracturing fluid through the tubing 16 into the open hole portion of the well 10. Desirably, the open hole portion of the well below the casing is isolated from the annular space 17 between tubing 16 and casing 14 by a packer 18 which is run on the tubing and is desirably set in the casing near the lower end. In some cases this may be a formation type packer which can be set below the casing in the open hole portion of the well to isolate a selected formation from the remainder of the formations exposed to the well. Obviously, a packer is not always required for isolating selected areas of a well since blankets of various types, as well-known in the art, may be substituted in some cases. After a packer has been set and tested or the selected zone has otherwise been isolated, the low-penetrating liquid is injected into the isolated zone, or in this case the open hole portion 13 of the well, through the tubing. This low-penetrating liquid is injected into the well under sufficient pressure to displace the well fluids from the isolated zone. Complete displacement of the well fluids from the isolated zone is generally readily recognized inasmuch as these well fluids can be displaced back into the formation relatively easily as compared to the low-penetrating liquid which, as indicated, has a considerably retarded tendency with respect to the well fluids to filter into the formation. When the well fluids have been displaced from the isolated zone in the well by the low-penetrating liquid, an increase in pressure is generally noted at the surface. Injection of the low-penetrating liquid into the well is then stopped, generally before a fracturing pressure has built up, i. e., before the formation is fractured. Typically, a pressure in pounds per square inch at the isolated zone of about ½ its depth in feet is considered the maximum permissible to avoid fracturing. As an alternate procedure, the tubing 16 may initially be lowered to the bottom of the well through the isolated zone and the well fluids therein may be displaced up the well before the packer is set as low-penetrating liquid is injected through the tubing. This leaves the open hole part of the well and particularly the isolated zone full of low-penetrating liquid. The tubing may then be raised so that its bottom end is at the upper end of the isolated zone and the packer can then be set to restrict flow of fluid upwardly in the well. With the isolated zone thus full of low-penetrating liquid, a first breaker as defined above, which is typically a fast acting breaker, may be introduced into the well and spotted at the selected elevation 19 at which permeable formation 11 is to be fractured. This breaker may comprise a chemical breaker, which is deposited by means of a dump bailer which is run into the well through the tubing on a wire line to the selected elevation. Similarly, capsules containing solvent, which sink through the low-penetrating liquid at a known rate and which are destroyed by the action of the solvent or breaker therein or by the low-penetrating liquid, may also be employed. Another suitable means for placing a solvent type breaker at the desired elevation is to employ a second macaroni-type tube string which is run through tubing 16 to the desired elevation. Still another and highly desirable method of increasing the filtrate rate in the well and in the adjacent formations of a low-penetrating liquid is to lower an element 21 into the well on a suitable suspending cable 22 to the elevation where a fracture is desired. In one embodiment in which the low-penetrating liquid is heat sensitive and which is unstable at high temperature, e. g., a high viscosity-index oil or an oil-water emulsion, this element may comprise an electric or chemical heating element. The cable is run into the tubing through a packing gland 23 so that the element 21 on the lower end thereof can be raised and lowered in the well while pressure is being applied to the low-penetrating or fracturing liquid. In still another alternative procedure it will be apparent that where the low-penetrating liquid is thixotropic and the filtrate rate of the low-penetrating liquid can thus be increased by rapid shear action, the element 21 may comprise a homogenizer or vibrator, typically an ultrasonic vibrator or agitator. In the preferred embodiment, a chemical solvent is lowered into the isolated zone of the well in a dump bailer to the elevation of the formation which is to be selectively fractured. As is well known, the solvent in the dump bailer may be deposited in the low-penetrating liquid at the selected elevation merely by running the bailer into the well to the selected elevation and then withdrawing the bailer from the well. As the dump bailer is raised, a valve is opened which permits the solvent to be displaced from the bailer by the low-penetrating liquid as the bailer is raised in the well. Various devices of this nature for depositing a material in a well will be apparent to those skilled in this art and in the art of cementing wells.

This first breaker is desirably a rapid acting breaker which will increase the filtrate rate of the low-penetrating liquid it contacts within a few minutes, typically 1–10 minutes, to the desired rate. Chemical solvents of this type are well known. For example, in the hydrocarbon-napalm type soap gels customarily used in hydraulic fracturing operations, ammonia and the low molecular weight amines such as dibutyl amine have been found to reduce substantially the viscosity and increase the filtrate rate of these gelled hydrocarbons within a few minutes. A demulsifier may be added to emulsion-type low-penetrating liquids. Also, in the case of emulsions wherein the water and hydrocarbon are emulsified with an emulsifying agent of the ester type, strong mineral acids hydrolyze the ester and break the emulsion very rapidly and thus reduce its viscosity and increase its filtrate rate within a few minutes. It will be apparent that the length of time the low-penetrating liquid must be exposed to the breaker to obtain a desired degree of reversion can generally only be determined for each low-penetrating liquid and the corresponding breaker by comparison at the surface under substantially identical conditions of mixing, temperature, etc. The amount of solvent or generically the amount of breaker is likewise determined by experience or skill under the prevailing conditions. The breaker, as it is disposed in the well, preferably covers an elevation of only a few feet, typically 2–10 feet, so that the low-penetrating liquid is reverted to a relatively higher penetrating liquid only through a relatively narrow zone. That is, from a lithologic or a permeability log of most wells, it can be seen that the zones or formations of low permeability are often narrow, less than about 10 feet in thickness. Inasmuch as it is generally more desirable to produce fractures in these zones of low permeability, it is desirable that the penetrating rate of the fracturing fluid into the formations be increased only through a very narrow zone. The amount of solvent may thus in a typical case vary from between about 1 gallon to about 10 or more gallons depending upon the diameter of the well, the thickness of the zone which is to be fractured, and the like. Consequently, the extent of the first breaker, as disposed in the well, should cover a zone of less than about 10 feet of the well.

The solvent is allowed to stand in contact with the low-penetrating liquid in the well and in the pores of the formation adjacent the well for a time sufficient to increase substantially the filtrate rate of the low-penetrating liquid therein. The time required to effect this increase in filtrate rate may be determined by a number of methods. Generally, the rate of reversion of a low-penetrating liquid with a particular breaker at various temperatures is known from laboratory or field experience or can be determined by comparison with the reversion rate of a sample of the low-penetrating liquid and the same or an equivalent breaker retained on the surface which are combined simultaneously with the contacting of the breaker with the low-penetrating liquid within the well. Desirably the surface samples are mixed or combined and retained at well temperatures, particularly where the reversion of the low-penetrating liquid is temperature sensitive. When the filtrate rate of the low-penetrating liquid in the isolated zone and in the adjacent formations at the selected elevation has been increased substantially, typically between about 2 and about 10 times the filtrate rate of the remainder of the low-penetrating liquid in the isolated zone, a high pressure is applied to the low-penetrating liquid either by injecting into the well additional low-penetrating liquid or by injecting a different follower fluid such as water or a light hydrocarbon. This follower fluid is desirably injected into the well at a high rate, typically in the range 2–10 barrels per minute, so that the low-penetrating liquid which now has an increased filtrate rate at the selected elevation can be injected into the selected formation at a rate sufficient to produce a pressure buildup within the formation adjacent the well that will overcome the tensile strength of the rock so that a fracture can be produced.

As indicated above, inasmuch as the fracturing liquid which has been reverted by the breaker penetrates the formations more readily than the main body of the non-penetrating liquid, this reverted fracturing liquid is preferentially forced into the selected formation when pressure is applied at the surface, and if the follower fluid is injected into the well at sufficient rate, the selected formation will be fractured at a pressure substantially below the pressure required to fracture the other formations within the isolated zone which are exposed to the unreverted low-penetrating liquid. It can also readily be seen that once a fracture is produced and the low-penetrating liquid is flowing into the fracture, that fracture can be maintained and extended at a pressure lower than the pressure required to produce a second fracture at some other elevation in the well.

Accordingly, within a few minutes after the breaker has been deposited within the isolated zone, and after it has reverted the low-penetrating liquid at the selected elevation, the follower fluid which may comprise water, oil, gas, additional low-penetrating liquid, or the like is injected into the well at a high rate to produce a fracture. A fracture in the formation is generally recognized by a decrease in the resistance of the low-penetrating liquid to flow. Typically, after a fracture has been produced, the pressure on the low-penetrating liquid within the isolated zone cannot be increased even if the injection or pump rate is increased. Pumping of the low-penetrating liquid into the fracture can be continued as long as desired. For example, from about 10 to about 1,000 barrels or more of the low-penetrating liquid are usually injected into the fracture by pumping the follower fluid into the tubing at the surface. This extends the fracture back into the selected formation to any desired distance depending upon the amount of low-penetrating liquid and follower fluid injected into the well.

When the fracture has been extended the desired amount, injection of the fracturing liquid or follower fluid may be stopped. However, it is generally desirable to produce multiple fractures in the zones of low permeability. In that case, the entrance to the first fracture may be sealed by any desired method and a fracture may be produced in another selected formation or at another selected elevation. A desirable means of sealing the fracture is to incorporate in the fracturing liquid or the follower fluid a bridging material, preferably a granular type bridging material such as granular naphthalene, as disclosed in copending application S. N. 271,394 filed February 13, 1952, in the name of Joseph B. Clark, Jr., et al (now abandoned). As disclosed in that case, the bridging material may be incorporated in the fracturing liquid at the surface or it may be deposited in the liquid as by use of a dump bailer after the liquid is in the isolated zone. When the bridging material thus disposed in the fracturing fluid reaches the mouth of the fracture, the flow into the fracture is stopped and the pressure within the isolated zone is increased. Before a second fracture is produced, i. e., before a second formation breakdown pressure is reached, the injection of fracturing liquid into the well is discontinued, leaving the isolated zone and the tubing full of low-penetrating or fracturing liquid. To cause a second fracture at a selected elevation, a breaker is again placed in the isolated zone at the elevation of the formation which is to be selectively fractured. This breaker then reverts the low-penetrating liquid at that elevation in the well and the adjacent formation, increasing its rate of filtration into the formation at the selected elevation so that when pressure is again applied by pumping additional fluid into the isolated zone through a tubing, a fracture can be produced at the second selected elevation in the same manner that the first fracture was produced. These steps can, of course, be continued, and the formation or formations exposed in the isolated zone can be selectively fractured as many times and at as many elevations as desired.

Since it is considered desirable to remove the low-penetrating liquid from the formation, that liquid is reverted to a liquid having a high rate of penetration through the formation. This is accomplished by the use of a second or slow-acting breaker which may be present in the formation or which may be injected into the formation. The viscosities of some of the fracturing fluids are broken by contact with the formations or the formation fluids. Similarly, contact with the formations or formation fluids in some cases breaks or increases the filtrate rate of some of the low-penetrating liquid. In other cases, the second or delayed-action breaker, typically a solvent, may be injected into the formation either before, simultaneously with, or after the fracturing liquid has been injected into the formation. Preferably the fracturing liquid contains a delayed-action solvent type of breaker which reverts the fracturing liquid to a liquid having substantially the viscosity and filtrate rate of the formation fluids after the fracturing liquid has been in the formation for several hours, typically from about 2 to about 24 hours or more. This incorporated delayed-action breaker acts to revert the low-penetrating liquid substantially slower than the first breaker which is injected into the low-penetrating liquid within the isolated zone to revert a portion of the low-penetrating liquid in the well and in the adjacent formations prior to the production of a fracture. In the preferred embodiment where the low-penetrating liquid comprises a hydrocarbon-napalm type soap gel, the first breaker, i. e., the breaker used to revert the low-penetrating liquid prior to the fracture, may comprise, as indicated above, a surface active agent such as the amines or the oil-soluble sulfonates and the second breaker, i. e., the breaker which reverts the low-penetrating liquid after the liquid has been injected into a fracture may comprise a small percent, e. g., between about 0.5 and about 3 percent by volume, of water or a weak acid solution.

The emulsion type fracturing liquids are similarly broken by a demulsifier which is specific to this emulsion, a rapid-acting demulsifier being employed as the breaker in the well and a delayed-action or dormant demulsifier being used as the second breaker. In the case of oil-acid emulsions, as, for example, those emulsified with a water-soluble or water-dispersable gum, the acid resistant rapid-acting demulsifiers, e. g. a sulfonic acid such as Tretolite 16445 or a strong base such as ammonium hydroxide, may be injected into the emulsion within the isolated zone and the closely adjacent formations to revert a portion of the emulsion as the first breaker. The main body of the emulsion is then reverted within the formation by reaction of the acid component with the calcareous materials of the formation, the second breaker in this case being produced in situ within the formation by the reaction.

After all of the low-penetrating liquid, and the second breaker, have been injected into the formation, the well may be placed on production to remove the extraneous fluids either alone or with the formation fluids within the formation. In some cases, it is considered desirable to shut the well in for a few hours to allow the low-penetrating liquid to be completely reverted to a high-penetrating liquid having a filtrate rate throughout the formation substantially equal to the filtrate rate of the connate fluids. In some cases, it will be apparent that this process may be employed in a water input or water disposal well and that whereas in the ordinary producing well fluids are withdrawn from the well to remove the extraneous liquids such as the reverted low-penetrating liquid and the breaker, the reverted low-penetrating liquid may be displaced back through the formation with the water at a water injection well without producing any deleterious effect upon the permeability of the formations.

From the foregoing, it will be apparent that this invention is susceptible of a wide variety of embodiments. It will also be apparent that many modifications of the hydraulic fracturing process including, for example, the incorporation of a propping agent such as sand in the low-penetrating liquids can be employed in this process without departing from the spirit of the invention. These and other modifications of the invention should, therefore, be construed to fall within the spirit and intent of this invention as the scope of the appended claims provides.

We claim:

1. A method of increasing the productivity of a selected permeable formation penetrated by a well comprising isolating a zone in said well which zone spans a multiplicity of permeable formations including and intersecting said selected permeable formation, disposing throughout said isolated zone a low-penetrating liquid which has, with respect to the well liquids, a substantially retarded tendency to filter into the permeable formations intersected by said isolated zone and which is capable of being reverted within said selected permeable formation to a fluid having substantially the same tendency to filter through said selected permeable formation as the fluid in said selected permeable formation, subsequently disposing a breaker specific for said low-penetrating liquid in said isolated zone at only the elevation of said selected permeable formation and not at any other elevation so that said low-penetrating liquid at only the elevation of said selected permeable formation will be contacted by said breaker and the remainder of said low-penetrating liquid in said isolated zone will not be contacted, allowing said breaker to remain in contact with said low-penetrating liquid at the elevation of said selected permeable formation in said isolated zone for a sufficient time to revert said low-penetrating liquid to a liquid having an increased rate of filtration into said selected permeable formation, and then applying sufficient pressure to said low-penetrating liquid in said isolated zone to fracture said selected permeable formation.

2. A method of increasing the productivity of a permeable formation penetrated by a well at a selected elevation comprising disposing in said well throughout the area which is intersected by all the permeable zones penetrated by said well a low-penetrating liquid having an incorporated dormant breaker specific for said low-penetrating liquid, said dormant breaker being adapted to revert said low-penetrating liquid after a period of time to a liquid having substantially the filtrate rate of the formation fluids within said formation, disposing in said low-penetrating liquid within said well at only said selected elevation and not at any other elevation in said well, a separate breaker specific for said low-penetrating liquid so that said low-penetrating liquid at only said selected elevation will be contacted by said breaker and the filtrate rate of the remainder of said low-penetrating liquid in said area will not be materially affected, said separate breaker having with respect to said incorporated dormant breaker a substantially accelerated rate of reversion of said low-penetrating liquid, allowing said separate breaker to remain in contact with said low-penetrating liquid in said well for a time sufficient to revert said low-penetrating liquid at said selected elevation to a liquid having a filtrate rate higher than the filtrate rate of the main body of said low-penetrating liquid in said well and lower than the filtrate rate of the well fluids in said formation, applying a pressure to said low-penetrating liquid in said well sufficient to fracture said formation, continuing the application of pressure to said low-penetrating liquid to extend said fraction with low penetrating liquid that has not been reverted by either of said breakers, and producing said well to remove well fluids and the reverted low-penetrating liquid from said formation.

3. A method according to claim 2 in which the viscosity of said low-penetrating liquid is initially greater than about 5,000 centipoises and in which said time said specific breaker is allowed to remain in contact with said low-penetrating liquid is sufficient to reduce the viscosity of said low-penetrating liquid at the elevation of said selected formation to about ½ of the viscosity of said low-penetrating liquid initially before applying said pressure to fracture said formation.

4. A method of increasing the productivity of a permeable formation at a selected elevation in a well comprising isolating a zone in said well which includes and intersects said selected elevation, said zone including a multiplicity of other elevations, disposing throughout said isolated zone, a low-penetrating liquid which has initially, with respect to the well fluids, a substantially retarded tendency to filter into the permeable formations penetrated by said isolated zone and which is capable of being reverted to a liquid which filters through said permeable formations at about the same rate as said well fluids and which is capable of being partially reverted within the well by a breaker to a liquid having an increased rate of filtration into said selected formation, disposing in said low-penetrating liquid at only said selected elevation a breaker specific for said low-penetrating liquid to increase the filtrate rate of a portion of said low-penetrating liquid at said selected formation, then, after allowing time for said breaker to revert a portion of said low-penetrating liquid to a low-penetrating liquid having an increased rate of filtration into said permeable formations, applying sufficient pressure to said low-penetrating liquid in said isolated zone to fracture said selected formation, continuing the application of pressure to said low-penetrating liquid to extend said fracture with low-penetrating liquid which has not been reverted by said breaker, and allowing said low-penetrating liquid to remain in said formation until it is reverted to a liquid having substantially the filtrate rate of the formation fluids within said formation.

5. A method according to claim 2 in which the filtrate rate of said low-penetrating liquid increases with temperature and in which said separate breaker comprises means for heating said low-penetrating liquid at said selected elevation.

6. A method according to claim 2 in which said low-penetrating liquid is thixotropic and in which said breaker comprises means to shear said low-penetrating liquid at a high rate.

7. In a method of increasing the productivity of a selected formation penetrated by a well comprising disposing a low-penetrating liquid in a zone of said well which intersects said selected formation and which spans all exposed permeable formations, contacting said low-penetrating liquid in said well at only the elevation of said selected formation with a breaker specific for said low-penetrating liquid to increase the filtrate rate of said low-penetrating liquid at said elevation, allowing said breaker to remain in contact with said low-penetrating liquid at said elevation until the filtrate rate of said low-penetrating liquid at said elevation is substantially increased, and then applying sufficient pressure to said low-penetrating liquid which is at least partially reverted, to fracture said selected formation.

8. A method of increasing the productivity of a selected formation penetrated by a well comprising disposing a body of low-penetrating liquid in a zone of said well which intersects said selected formation and which spans a multiplicity of permeable formations, subsequently injecting into said low-penetrating liquid at only the elevation in said well of said selected formation a breaker specific for said low-penetrating 'liquid, allowing said breaker to remain in contact with said low-penetrating liquid at said elevation for a time sufficient to revert at least in part said low-penetrating liquid at said elevation to a low-penetrating liquid which penetrates said selected formation more readily than said body of low-penetrating liquid, and then applying sufficient pressure to said low-penetrating liquid which is at least partially reverted to fracture said selected formation.

References Cited in the file of this patent

UNITED STATES PATENTS

| | | |
|---|---|---|
| 1,998,756 | Grebe et al. | Apr. 23, 1935 |
| 2,223,397 | White et al. | Dec. 3, 1940 |
| 2,596,843 | Farris | May 13, 1952 |
| 2,596,137 | Fast | May 13, 1952 |
| 2,788,072 | Goodwin | Apr. 9, 1957 |

OTHER REFERENCES

Petroleum Engineer, October 1951, pages B53, 54 and 56.

Rock Rupture as Affected by Fluid Properties by P. P. Scott, Jr., Journal of Petroleum Technology, April 1953, pages 111 to 124 inclusive. (This manuscript was made public October 1, 1952.)